US007335341B2

(12) United States Patent
Van Steenkiste et al.

(10) Patent No.: US 7,335,341 B2
(45) Date of Patent: Feb. 26, 2008

(54) METHOD FOR SECURING CERAMIC STRUCTURES AND FORMING ELECTRICAL CONNECTIONS ON THE SAME

(75) Inventors: Thomas Hubert Van Steenkiste, Ray, MI (US); Joseph V. Mantese, Shelby Township, MI (US); Bob Xiaobin Li, Grand Blanc, MI (US); Pertrice Auguste Wethey, Rockford, MI (US); Robert Paul Johnston, Davison, MI (US); David Emil Nelson, Independence Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 897 days.

(21) Appl. No.: 10/697,922

(22) Filed: Oct. 30, 2003

(65) Prior Publication Data

US 2005/0100489 A1 May 12, 2005

(51) Int. Cl.
*B01J 19/08* (2006.01)
*B05D 1/12* (2006.01)

(52) U.S. Cl. ................. 422/186.04; 427/191; 427/192; 427/419.1

(58) Field of Classification Search ........... 422/186.04; 427/191, 192, 419.1
See application file for complete search history.

(56) References Cited

U.S. PATENT DOCUMENTS

| | | | |
|---|---|---|---|
| 2,861,900 | A | 11/1958 | Smith et al. |
| 3,100,724 | A | 8/1963 | Rocheville |
| 3,876,456 | A | 4/1975 | Ford et al. |
| 3,993,411 | A | 11/1976 | Babcock et al. |
| 3,996,398 | A | 12/1976 | Manfredi |
| 4,263,335 | A | 4/1981 | Wagner et al. |
| 4,416,421 | A | 11/1983 | Browning et al. |
| 4,606,495 | A | 8/1986 | Stewart, Jr. et al. |
| 4,891,275 | A | 1/1990 | Knoll |
| 4,939,022 | A | 7/1990 | Palanisamy |
| 5,187,021 | A | 2/1993 | Vydra et al. |
| 5,217,746 | A | 6/1993 | Lenling et al. |
| 5,271,965 | A | 12/1993 | Browning |
| 5,302,414 | A | 4/1994 | Alknimov et al. |
| 5,308,463 | A | 5/1994 | Hoffmann et al. |
| 5,328,751 | A | 7/1994 | Komorita et al. |
| 5,340,015 | A | 8/1994 | Hira et al. |
| 5,362,523 | A | 11/1994 | Gorynin et al. |

(Continued)

FOREIGN PATENT DOCUMENTS

DE 42 36 911 12/1993

(Continued)

OTHER PUBLICATIONS

European Search Report dated Jan. 29, 2004 and it's Annex.

(Continued)

*Primary Examiner*—Kishor Mayekar
(74) *Attorney, Agent, or Firm*—Douglas D. Fekete

(57) ABSTRACT

A new kinetic spray process is disclosed that enables one to secure a plurality of ceramic elements together quickly without the need for glues or other adhesives. The process finds special utilization in the formation of non-thermal plasma reactors wherein the kinetic spray process can be used to simultaneously secure the ceramic elements together and to form electrical connections between like electrodes in the non-thermal plasma reactor.

28 Claims, 3 Drawing Sheets

U.S. PATENT DOCUMENTS

| | | | |
|---|---|---|---|
| 5,395,679 | A | 3/1995 | Myers et al. |
| 5,424,101 | A | 6/1995 | Atkins et al. |
| 5,464,146 | A | 11/1995 | Zalvzec et al. |
| 5,465,627 | A | 11/1995 | Garshelis |
| 5,476,725 | A | 12/1995 | Papich et al. |
| 5,493,921 | A | 2/1996 | Alasafi |
| 5,520,059 | A | 5/1996 | Garshelis |
| 5,525,570 | A | 6/1996 | Chakraborty et al. |
| 5,527,627 | A | 6/1996 | Lautzenhiser et al. |
| 5,585,574 | A | 12/1996 | Sugihara et al. |
| 5,593,740 | A | 1/1997 | Strumbon et al. |
| 5,648,123 | A | 7/1997 | Kuhn et al. |
| 5,683,615 | A | 11/1997 | Munoz |
| 5,706,572 | A | 1/1998 | Garshelis |
| 5,708,216 | A | 1/1998 | Garshelis |
| 5,725,023 | A | 3/1998 | Padula |
| 5,795,626 | A | 8/1998 | Grabel et al. |
| 5,854,966 | A | 12/1998 | Kampe et al. |
| 5,875,626 | A | 3/1999 | Singer et al. |
| 5,887,335 | A | 3/1999 | Garshelis |
| 5,889,215 | A | 3/1999 | Kilmartin et al. |
| 5,894,054 | A | 4/1999 | Poruchuri et al. |
| 5,907,105 | A | 5/1999 | Pinkerton |
| 5,907,761 | A | 5/1999 | Tohma et al. |
| 5,952,056 | A | 9/1999 | Jordan et al. |
| 5,965,193 | A | 10/1999 | Ning et al. |
| 5,989,310 | A | 11/1999 | Chu et al. |
| 5,993,565 | A | 11/1999 | Pinkerton |
| 6,033,622 | A | 3/2000 | Maruyama |
| 6,047,605 | A | 4/2000 | Garshelis |
| 6,051,045 | A | 4/2000 | Narula et al. |
| 6,051,277 | A | 4/2000 | Claussen et al. |
| 6,074,737 | A | 6/2000 | Jordan et al. |
| 6,098,741 | A | 8/2000 | Gluf |
| 6,119,667 | A | 9/2000 | Boyer et al. |
| 6,129,948 | A | 10/2000 | Plummet et al. |
| 6,139,913 | A | 10/2000 | Van Steenkiste et al. |
| 6,145,387 | A | 11/2000 | Garshelis |
| 6,149,736 | A | 11/2000 | Sugihara |
| 6,159,430 | A | 12/2000 | Foster |
| 6,189,663 | B1 | 2/2001 | Smith et al. |
| 6,260,423 | B1 | 7/2001 | Garshelis |
| 6,261,703 | B1 | 7/2001 | Sasaki et al. |
| 6,283,386 | B1 | 9/2001 | Van Steenkiste et al. |
| 6,283,859 | B1 | 9/2001 | Carlson et al. |
| 6,289,748 | B1 | 9/2001 | Lin et al. |
| 6,338,827 | B1 | 1/2002 | Nelson et al. |
| 6,344,237 | B1 | 2/2002 | Kilmer et al. |
| 6,374,664 | B1 | 4/2002 | Bauer |
| 6,402,050 | B1 | 6/2002 | Kashirin et al. |
| 6,422,360 | B1 | 7/2002 | Oliver et al. |
| 6,424,896 | B1 | 7/2002 | Lin |
| 6,442,039 | B1 | 8/2002 | Schreiber |
| 6,446,857 | B1 | 9/2002 | Kent et al. |
| 6,465,039 | B1 | 10/2002 | Pinkerton et al. |
| 6,485,852 | B1 | 11/2002 | Miller et al. |
| 6,488,115 | B1 | 12/2002 | Ozsoylu |
| 6,490,934 | B2 | 12/2002 | Garshelis |
| 6,511,135 | B2 | 1/2003 | Ballinger et al. |
| 6,537,507 | B2 | 3/2003 | Nelson et al. |
| 6,551,734 | B1 | 4/2003 | Simpkins et al. |
| 6,553,847 | B2 | 4/2003 | Garshelis |
| 6,615,488 | B2 | 9/2003 | Anders |
| 6,623,704 | B1 | 9/2003 | Roth |
| 6,623,796 | B1 | 9/2003 | VanSteenkiste et al. |
| 2002/0071906 | A1 | 6/2002 | Rusch |
| 2002/0073982 | A1 | 6/2002 | Shaikh et al. |
| 2002/0102360 | A1 | 8/2002 | Subramanian et al. |
| 2002/0110682 | A1 | 8/2002 | Brogan et al. |
| 2002/0112549 | A1 | 8/2002 | Cheshmehdoost et al. |
| 2002/0182311 | A1 | 12/2002 | Leonardi et al. |
| 2003/0039856 | A1 | 2/2003 | Gillispie et al. |
| 2003/0190414 | A1 | 10/2003 | VanSteenkiste |
| 2003/0219542 | A1 | 11/2003 | Ewasyshyn et al. |

FOREIGN PATENT DOCUMENTS

| | | |
|---|---|---|
| DE | 199 59 515 | 6/2001 |
| DE | 100 37 212 | 1/2002 |
| DE | 101 26 100 | 12/2002 |
| EP | 1 160 348 | 12/2001 |
| EP | 1245854 A2 | 2/2002 |
| JP | 55031161 | 3/1980 |
| JP | 61249541 | 11/1986 |
| JP | 04180770 | 6/1992 |
| JP | 04243524 | 8/1992 |
| WO | 98/22639 | 5/1998 |
| WO | 02/052064 | 1/2002 |
| WO | 03009934 | 2/2003 |

OTHER PUBLICATIONS

Dykhuizen, et al.; *Gas Dynamic Principles of Cold Spray*; Journal of Thermal Spray Technology; Jun. 1998; pp. 205-212.

McCune, et al; *An Exploration of the Cold Gas-Dynamic Spray Method for Several Materials Systems*.

Ibrahim, et al; *Particulate Reinforced Metal Matrix Composites—A Review; Journal of Materials Science 26*; 1991, pp. 1137-1156.

I.J. Garshelis, et al; *A Magnetoelastic Torque Transducer Utilizing a Ring Divided into Two Oppositely Polarized Circumferential Regions*; MMM 1995; Paper No. BB-08.

I.J. Garshelis, et al; *Development of a Non-Contact Torque Transducer for Electric Power Steering Systems*; SAE Paper No. 920707; 1992; pp. 173-182.

Boley, et al; *The Effects of Heat Treatment on the Magnetic Behavior of Ring—Type Magnetoelastic Torque Sensors*; Proceedings of Sicon '01; Nov. 2001.

J.E. Snyder, et al; *Low Coercivity Magnetostrictive Material with Giant Piezomagnetic d33*, Abstract Submitted for the MAR99 Meeting of the American Physical Society, 1998.

McCune, et al; *An Exploration of the Cold Gas-Dynamic Spray Method . . .* ; Proc. Nat. Thermal Spray Conf. ASM Sep. 1995.

Pavel Ripka, et al; *Pulse Excitation of Micro-Fluxgate Sensors*, IEEE Transactions on Magnetics, vol. 37, No. 4, Jul. 2001, pp. 1998-2000.

Trifon M. Liakopoulos, et al; *Ultrahigh Resolution DC Magnetic Field Measurements Using Microfabricated Fluxgate Sensor Chips*, University of Cincinnati, Ohio, Center for Microelectronic Sensors and MEMS, Dept. of ECECS pp. 630-631.

Derac Son, *A New Type of Fluxgate Magnetometer Using Apparent Coercive Field Strength Measurement*, IEEE Transactions on Magnetics, vol. 25, No. 5, Sep. 1989, pp. 3420-3422.

O. Dezauri, et al; *Printed Circuit Board Integrated Fluxgate Sensor*, Elsevier Science S. A. (2000) Sensors and Actuators, pp. 200-203.

How, et al; *Generation of High-Order Harmonics in Insulator Magnetic Fluxgate Sensor Cores*; IEEE Transactions on Magnetics, vol. 37, No. 4, Jul. 2001, pp. 2448-2450.

Moreland, *Fluxgate Magnetometer*, Carl W. Moreland, 199-2000, pp. 1-9.

Ripka, et al; *Symmetrical Core Improves Micro-Fluxgate Sensors*, Sensors and Acutuators, Version 1, Aug. 25, 2000, pp. 1-9.

Hoton How, et al; *Development of High-Sensitivity Fluxgate Magnetometer Using Single-Crystal Yttrium Iron Garnet Thick Film as the Core Material, ElectroMagnnetic Applications, Inc.*.

Ripka, et al; *Microfluxgate Sensor with Closed Core*, submitted for Sensors and Actuators, Version 1, Jun. 17, 2000.

Henriksen, et al; *Digital Detection and Feedback Fluxgate Magnetometer*, Meas. Sci. Technol. 7 (1996) pp. 897-903.

Cetek 930580 Compass Sensor, *Specifications*, Jun. 1997.

Geyger, *Basic Principles Characteristics and Applications*, Magnetic Amplifier Circuits, 1954, pp. 219-232.

Van Steenkiste, et al; *Kinetic Spray Coatings*; in Surface & Coatings Technology III; 1999; pp. 62-71.

Liu, et al; *Recent Development in the Fabrication of Metal Matrix-Particulate Composites Using Powder Metallurgy Techniques*; in Journal of Material Science 29; 1994; pp. 1999-2007; National University of Singapore, Japan.
Papyrin; *The Cold Gas-Dynamic Spraying Method a New Method for Coatings Deposition Promises a New Generation of Technologies*; Novosibirsk, Russia.
McCune, al; Characterization of Copper and Steel Coatings Made by the Cold Gas-Dynamic Spray Method; National Thermal Spray Conference.
Alkhimov, et al; *A Method of "Cold" Gas-Dynamic Deposition; Sov. Phys. Kokl. 36*(Dec. 12, 1990; pp. 1047-1049.
Dykuizen, et al; *Impact of High Velocity Cold Spray Particles*; in Journal of Thermal Spray Technology 8(4); 1999; pp. 559-564.
Swartz, et al; *Thermal Resistance At Interfaces; Appl. Phys. Lett.*, vol. 51, No. 26,28; Dec. 1987; pp. 2201-2202.
Davis, et al; *Thermal Conductivity of Metal-Matrix Composlites; J.Appl. Phys. 77* (10), May 15, 1995; pp. 4494-4960.
Stoner et al; *Measurements of the Kapitza Conductance between Diamond and Several Metals*; Physical Review Letters, vol. 68, No. 10; Mar. 9, 1992; pp. 1563-1566.
Stoner et al; *Kapitza conductance and heat flow between solids at temperatures from 50 to 300K*; Physical Review B, vol. 48, No. 22, Dec. 1, 1993-II; pp. 16374;16387.
Johnson et al; *Diamond/Al metal matrix composites formed by the pressureless metal infiltration process*; J. Mater, Res., vol. 8, No. 5, May 1993; pp. 11691173.
Rajan et al; *Reinforcement coatings and interfaces in Aluminium Metal Matrix Composites*; pp. 3491-3503, 1998.
*LEC Manufacturing and Engineering Capabilities*; Lanxide Electronic Components, Inc.
Dykhuizen et al; *Gas Dynamic Principles of Cold Spray*; Journal of Thermal Spray Technology; Jun. 1998; pp. 205-212.
McCune et al; *An Exploration of the Cold Gas-Dynamic Spray Method For Several Materials Systems.*
Ibrahim et al; *Particulate Reinforced Metal Matrix Composites—A Review; Journal of Matrials Science 26*; 1991, pp. 1137-1156.

METHOD FOR SECURING CERAMIC STRUCTURES AND FORMING ELECTRICAL CONNECTIONS ON THE SAME

TECHNICAL FIELD

The present invention is directed toward a method for securing the elements of a ceramic structure together, and more particularly, toward a method that both secures the ceramic elements together and provides for an electrical connection between the elements.

INCORPORATION BY REFERENCE

The present invention comprises an improvement to the kinetic spray process as generally described in U.S. Pat. Nos. 6,139,913, 6,283,386 and the articles by Van Steenkiste, et al. entitled "Kinetic Spray Coatings" published in Surface and Coatings Technology Volume III, Pages 62-72, Jan. 10, 1999, and "Aluminum coatings via kinetic spray with relatively large powder particles", published in Surface and Coatings Technology 154, pp. 237-252, 2002, all of which are herein incorporated by reference.

BACKGROUND OF THE INVENTION

A new technique for producing coatings on a wide variety of substrate surfaces by kinetic spray, or cold gas dynamic spray, was recently reported in two articles by T. H. Van Steenkiste et al. The first was entitled "Kinetic Spray Coatings," published in Surface and Coatings Technology, vol. 111, pages 62-71, Jan. 10, 1999 and the second was entitled "Aluminum coatings via kinetic spray with relatively large powder particles", published in Surface and Coatings Technology 154, pp. 237-252, 2002. The articles discuss producing continuous layer coatings having high adhesion, low oxide content and low thermal stress. The articles describe coatings being produced by entraining metal powders in an accelerated gas stream, through a converging-diverging de Laval type nozzle and projecting them against a target substrate. The particles are accelerated in the high velocity gas stream by the drag effect. The gas used can be any of a variety of gases including air or helium. It was found that the particles that formed the coating did not melt or thermally soften prior to impingement onto the substrate. It is theorized that the particles adhere to the substrate when their kinetic energy is converted to a sufficient level of thermal and mechanical deformation. Thus, it is believed that the particle velocity must exceed a critical velocity high enough to exceed the yield stress of the particle to permit it to adhere when it strikes the substrate. It was found that the deposition efficiency of a given particle mixture was increased as the inlet air temperature was increased. Increasing the inlet air temperature decreases its density and thus increases its velocity. The velocity varies approximately as the square root of the inlet air temperature. The actual mechanism of bonding of the particles to the substrate surface is not fully known at this time. The critical velocity is dependent on the material of the particle. Once an initial layer of particles has been formed on a substrate subsequent particles bind not only to the voids between previous particles bound to the substrate but also engage in particle to particle bonds. The bonding process is not due to melting of the particles in the main gas stream because the temperature of the particles is always below their melting temperature.

There is often a need in industry to secure a plurality of ceramic elements to each other. There are also ceramic structures that require establishment of electrical connections between elements on closely adjacent ceramic elements. Typically, ceramic elements are joined to each other by the steps of applying a glass adhesive to the various ceramic elements, assembling the ceramic structure formed from the elements, clamping or holding the structure together and then heating the entire structure in a furnace to cure the adhesive. This multi-step process is cumbersome and time consuming. In other applications ceramic elements are both bound together with an adhesive and regions are painted several layers of a silver paint to establish an electrical connection between the ceramic elements. It would be advantageous to develop a single step, rapid method to permit both binding of ceramic elements together and establishment of electrical connections between the ceramic elements.

SUMMARY OF THE INVENTION

In one embodiment of the present invention a plurality of ceramic elements are secured to each other by at least a first band of a kinetic spray applied material.

In another embodiment, the present invention is a non-thermal plasma reactor comprising a plurality of ceramic elements arranged in a stack, the stack including at least a first plurality of ceramic elements and a second plurality of ceramic elements; the first plurality of ceramic elements each having a ground electrode with a connector, the second plurality of ceramic elements each having a charge electrode with a connector; a first band of an electrically conductive material applied by a kinetic spray process and electrically coupling the connectors of the ground electrodes and a second band of an electrically conductive material applied by a kinetic spray process and electrically coupling the connectors of the charge electrodes; and the first and second bands securing the plurality of ceramic elements together.

In another embodiment, the present invention is a method of securing a plurality of ceramic elements to each other comprising the steps of: providing particles of a material to be sprayed; providing a supersonic nozzle; providing a plurality of ceramic elements releasably held together and positioned opposite the nozzle; directing a flow of a gas through the nozzle, the gas having a temperature of from 600 to 1200 degrees Fahrenheit; and entraining the particles in the flow of the gas and accelerating the particles to a velocity sufficient to result in adherence of the particles to the ceramic elements upon impact, thereby forming at least a first band of adhered material on the ceramic elements and securing the ceramic elements together.

In another embodiment, the present invention is a method of forming a non-thermal plasma reactor comprising the steps of: providing particles of an electrically conductive material to be sprayed; providing a supersonic nozzle; providing a first plurality of ceramic elements and a second plurality of ceramic elements, the ceramic elements releasably held together and positioned opposite the nozzle, with the first plurality of ceramic elements each having a ground electrode with a connector and the second plurality of ceramic elements each having a charge electrode with a connector; directing a flow of a gas through the nozzle, the gas having a temperature of from 600 to 1200 degrees Fahrenheit; and entraining the particles in the flow of the gas and accelerating the particles to a velocity sufficient to result in adherence of the particles to the ceramic elements upon impact, directing the accelerated particles at the connectors of the first plurality of ceramic elements forming a first band of adhered material electrically coupling the electrodes of the first plurality of ceramic elements together and directing the accelerated particles at the connectors of the second plurality of ceramic elements forming a second band of adhered material electrically coupling the electrodes of the second plurality of ceramic elements together, and the first and the second bands securing the ceramic elements together.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
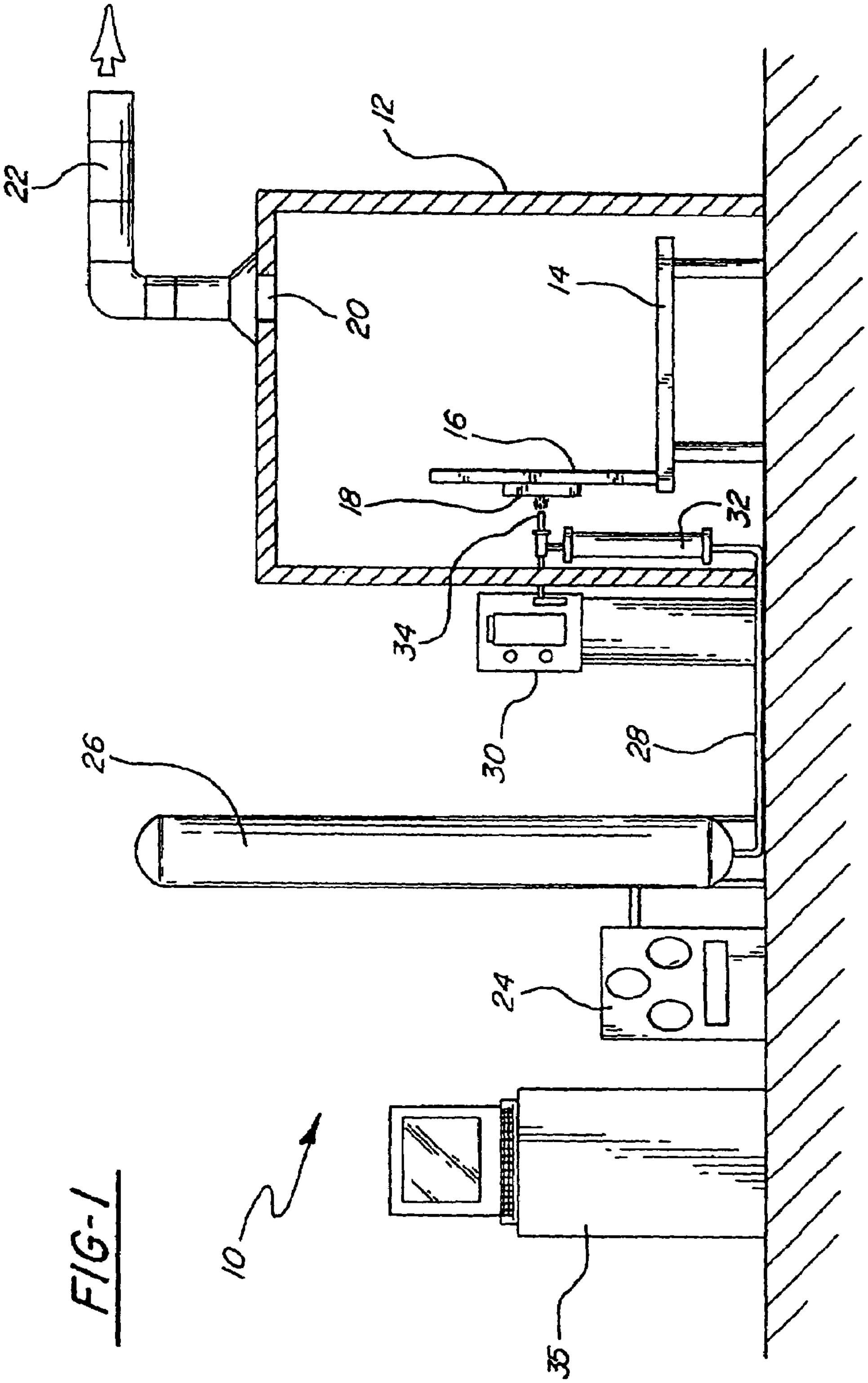
FIG. 1 is a generally schematic layout illustrating a kinetic spray system for performing the method of the present invention.

Referring first to FIG. 1, a kinetic spray system according to the present invention is generally shown at 10. System 10 includes an enclosure 12 in which a support table 14 or other support means is located. A mounting panel 16 fixed to the table 14 supports a work holder 18 capable of movement in three dimensions and able to support a suitable workpiece formed of a ceramic structure to be coated. The work holder 18 is preferably designed to move a structure relative to a nozzle 34 of the system 10, thereby controlling where the powder material is deposited on the structure. The enclosure 12 includes surrounding walls having at least one air inlet, not shown, and an air outlet 20 connected by a suitable exhaust conduit 22 to a dust collector, not shown. During coating operations, the dust collector continually draws air from the enclosure 12 and collects any dust or particles contained in the exhaust air for subsequent disposal.

The spray system 10 further includes an air compressor 24 capable of supplying air pressure up to 3.4 MPa (500 psi) to a high pressure air ballast tank 26. The air ballast tank 26 is connected through a line 28 to both a high pressure powder feeder 30 and a separate air heater 32. The air heater 32 supplies high pressure heated air, the main gas described below, to a kinetic spray nozzle 34. The pressure of the main gas generally is set at from 150 to 500 psi, more preferably from 300 to 400 psi. The high pressure powder feeder 30 mixes particles of a spray powder with high pressure air and supplies the mixture to a supplemental inlet line 48 of the nozzle 34. Preferably the particles are fed at a rate of from 20 to 80 grams per minute to the nozzle 34. A computer control 35 operates to control both the pressure of air supplied to the air heater 32 and the temperature of the heated main gas exiting the air heater 32.

The particles used in the present invention are preferably electrically conductive materials including: copper, copper alloys, nickel, nickel alloys, aluminum, aluminum alloys, stainless steels, and mixtures of these materials. Preferably the powders have nominal average particle sizes of from 60 to 106 microns and preferably from 60 to 90 microns. Depending on the particles or combination of particles chosen the main gas temperature may range from 600 to 1200 degrees Fahrenheit. With aluminum and its alloys the temperature preferably is around 600 degrees Fahrenheit, while the other materials preferably are sprayed at a main gas temperature of from 1000 to 1200 degrees Fahrenheit. Mixtures of the materials may be sprayed at from 600 to 1200 degrees Fahrenheit.

Figure 2:
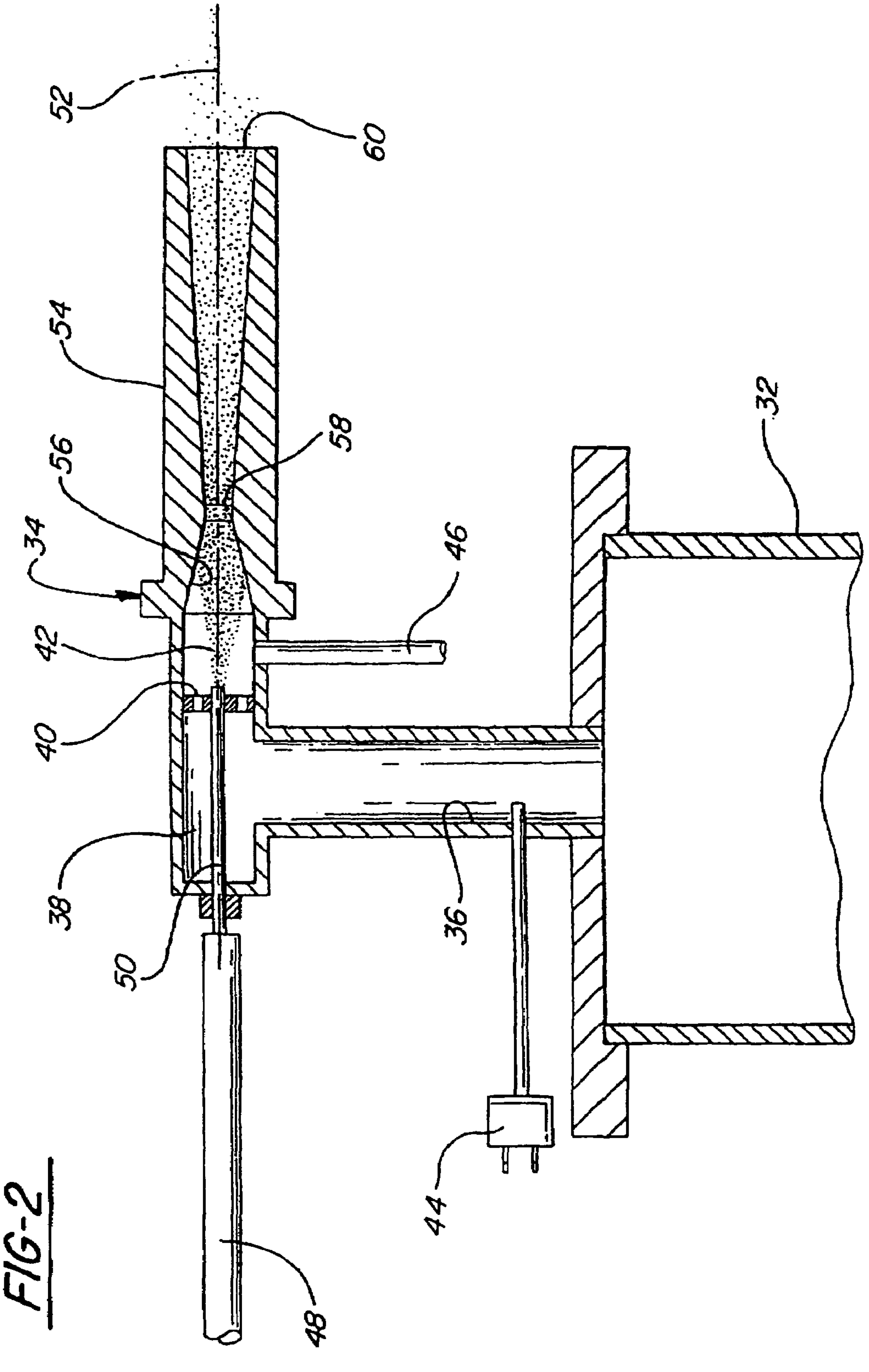
FIG. 2 is an enlarged cross-sectional view of a kinetic spray nozzle used in the system.

FIG. 2 is a cross-sectional view of the nozzle 34 and its connections to the air heater 32 and the powder feeder 30. A main air passage 36 connects the air heater 32 to the nozzle 34. Passage 36 connects with a premix chamber 38 that directs air through a flow straightener 40 and into a chamber 42. Temperature and pressure of the air or other heated main gas are monitored by a gas inlet temperature thermocouple 44 in the passage 36 and a pressure sensor 46 connected to the chamber 42. The main gas has a temperature that is always insufficient to cause melting within the nozzle 34 of any particles being sprayed. The main gas temperature can be well above the melt temperature of the particles. Main gas temperatures that are 5 to 7 fold above the melt temperature of the particles have been used in the present system 10. As discussed below, for the present invention it is preferred that the main gas temperature range from 600 to 1200 degrees Fahrenheit depending on the material that is sprayed. What is necessary is that the temperature and exposure time to the main gas be selected such that the particles do not melt in the nozzle 34. The temperature of the gas rapidly falls as it travels through the nozzle 34. In fact, the temperature of the gas measured as it exits the nozzle 34 is often at or below room temperature even when its initial temperature is above 1000° F.

The mixture of high pressure air and coating powder is fed through the supplemental inlet line 48 to a powder injector tube 50 comprising a straight pipe having a predetermined inner diameter. The tube 50 has a central axis 52 which is preferentially the same as the axis of the premix chamber 38. The tube 50 extends through the premix chamber 38 and the flow straightener 40 into the mixing chamber 42.

Chamber 42 is in communication with a de Laval type supersonic nozzle 54. The nozzle 54 has a central axis 52 and an entrance cone 56 that decreases in diameter to a throat 58. The entrance cone 56 forms a converging region of the nozzle 54. Downstream of the throat 58 is an exit end 60 and a diverging region is defined between the throat 58 and the exit end 60. The largest diameter of the entrance cone 56 may range from 10 to 6 millimeters, with 7.5 millimeters being preferred. The entrance cone 56 narrows to the throat 58. The throat 58 may have a diameter of from 3.5 to 1.5 millimeters, with from 3 to 2 millimeters being preferred. The diverging region of the nozzle 54 from downstream of the throat 58 to the exit end 60 may have a variety of shapes, but in a preferred embodiment it has a rectangular cross-sectional shape. At the exit end 60 the nozzle 54 preferably has a rectangular shape with a long dimension of from 8 to 14 millimeters by a short dimension of from 2 to 6 millimeters.

As disclosed in U.S. Pat. Nos. 6,139,913 and 6,283,386 the powder injector tube 50 supplies a particle powder mixture to the system 10 under a pressure in excess of the pressure of the heated main gas from the passage 36. The nozzle 54 produces an exit velocity of the entrained particles of from 300 meters per second to as high as 1200 meters per second. The entrained particles gain kinetic and thermal energy during their flow through this nozzle. It will be recognized by those of skill in the art that the temperature of the particles in the gas stream will vary depending on the particle size and the main gas temperature. The main gas temperature is defined as the temperature of heated high-pressure gas at the inlet to the nozzle 54. Since the particles are never heated to their melting point, even upon impact, there is no change in the solid phase of the original particles due to transfer of kinetic and thermal energy, and therefore no change in their original physical properties. The particles are always at a temperature below the main gas temperature. The particles exiting the nozzle 54 are directed toward a surface of a substrate to coat it.

It is preferred that the exit end 60 of the nozzle 54 have a standoff distance from the surface to be coated of from 10 to 40 millimeters and most preferably from 10 to 20 millimeters. Upon striking a substrate opposite the nozzle 54 the particles flatten into a nub-like structure with an aspect ratio of generally about 5 to 1. Upon impact the kinetic sprayed particles transfer substantially all of their kinetic and thermal energy to the substrate surface and stick if their yield stress has been exceeded. As discussed above, for a given particle to adhere to a substrate it is necessary that it reach or exceed its critical velocity which is defined as the velocity where at it will adhere to a substrate when it strikes the substrate after exiting the nozzle 54. This critical velocity is dependent on the material composition of the particle. In general, harder materials must achieve a higher critical velocity before they adhere to a given substrate. It is not known at this time exactly what is the nature of the particle to substrate bond; however, it is believed that a portion of the bond is due to the particles plastically deforming upon striking the substrate. Preferably the particles have an average nominal diameter of from 60 to 90 microns.

In the present invention it is preferred that the nozzle 34 be at an angle of from 0 to 45 degrees relative to a line drawn normal to the plane of the surface being coated, more preferably at an angle of from 15 to 25 degrees relative to the normal line. Preferably the work holder 18 moves the structure past the nozzle 34 at a traverse speed of from 0.6 to 13 centimeters per second and more preferably at a traverse speed of from 0.6 to 7 centimeters per second.

Experimental Data

The present invention will be described with respect to its utilization to form electrical connections and secure multiple ceramic elements in a non-thermal plasma reactor, however the present invention can be used to secure any plurality of ceramic elements together.

Figure 3:
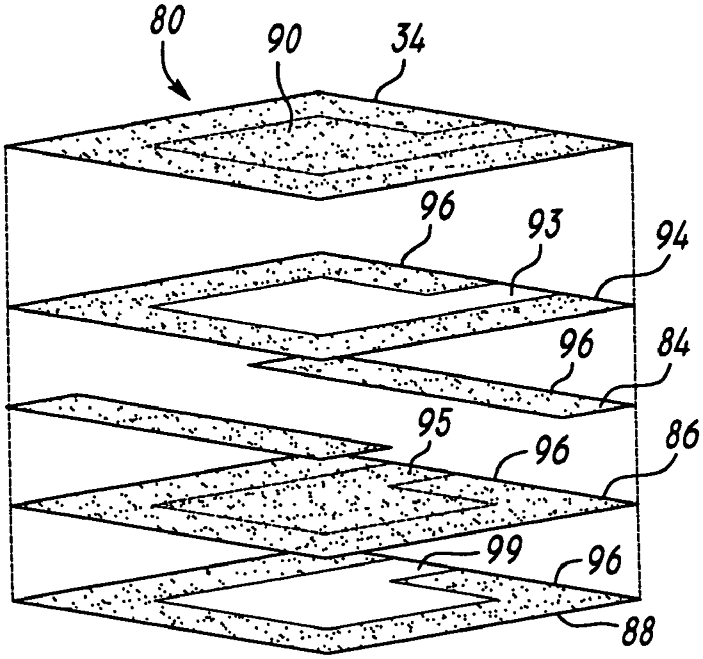
FIG. 3 is an exploded view of a cell of a non-thermal plasma reactor stack.

FIG. 3 is an exploded view of a single cell 80 of a non-thermal plasma reactor. The cell 80 includes a first ceramic element 82, a second ceramic element 84, a third ceramic element 86, and a fourth ceramic element 88. A pair of spacers 89 are located between the second and third ceramic elements 84, 86. The first ceramic element 82 includes a charge electrode 90 having a connector 92. The second ceramic element 84 includes a charge electrode 91 having a connector 93. The third ceramic element 86 includes a ground electrode 94 also having a connector 95. The fourth ceramic element 88 includes a ground electrode 97 also having a connector 99. The connectors 92, 93 of charge electrodes 90 and 91 are offset from the connectors 95 and 99 of ground electrodes 94 and 97 for reasons explained below. The electrodes 90, 91, 94, 97 and their connectors 92, 93, 95, 99 can comprise silver, tantalum, platinum, or any other conductive metal. They are applied to the ceramic elements 82, 84, 86 and 88 as is known in the art via any of a number of ways. These include painting, screen printing, and spray application. Each element 82, 84, 86, and 88 has an edge 96. Prior to the present invention the elements 82, 84, 86, 88 and the spacers 89 would need to be glued, clamped, and then fired to cure the glue. This was typically accomplished in the past by initially assembling the elements 82, 84, 86, 88 and spacers 89 using high temperature dielectric paste, clamping, and then firing to transform the paste into a sintered glass/ceramic dielectric bond layer.

Figure 4:
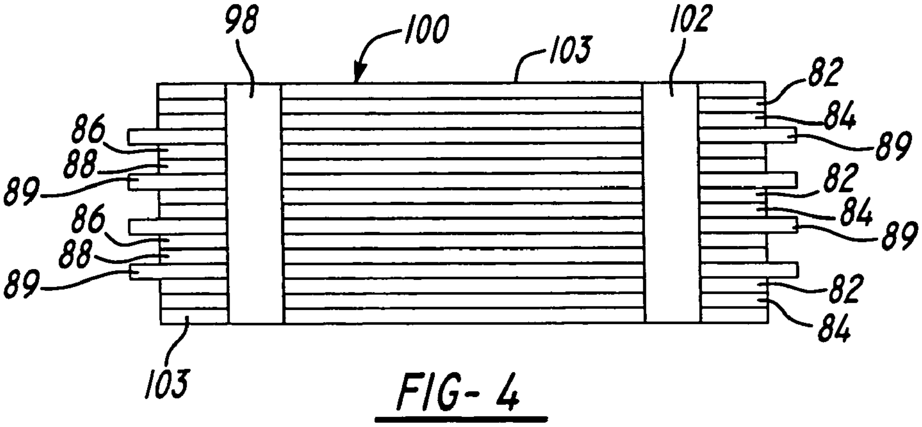
FIG. 4 is an end view of a part of a non-thermal plasma reactor stack secured using the method of the present invention.

In FIG. 4 an edge 96 view of an assembled non-thermal plasma reactor stack is shown at 100. The components are as described above. Additionally, ceramic endplates 103 without electrodes are placed on either side of the stack 100 to insulate the stack 100. Once the stack 100 is assembled it is clamped into work holder 18 and held in place. Then using the spray parameters described above a first band 98 of electrically conductive material was applied by the kinetic spray process described herein. The first band 98 replaces the previously used glue and serves to hold the elements of the stack 100 together. The first band 98 is applied over the set of connectors 92, 93 thereby electrically coupling all of the first and second element 82, 84 electrodes 90, 91 to each other. A second band 102 of electrically conductive material was applied by the kinetic spray process described herein. The second band 102 also replaces the previously used glue and serves to hold the elements of the stack 100 together. The second band 102 is applied over the other set of connectors 95, 99 thereby electrically coupling all of the third and fourth element 86, 88 electrodes 94, 97 to each other. Stack 100 may be further sprayed by the kinetic spray process described herein on the edge opposite edge 96 to further secure the elements together. The thickness of the first and second bands 98, 102 may vary from 1 millimeter to 2.5 centimeters depending on the stack 100 configuration. Generally, the material forming the bands 98, 102 is applied to the edge 96 at an angle of from 0 to 45 degrees relative to a line drawn normal to the edge 96. More preferably the angle is from 15 to 25 degrees. In some embodiments it can be desirable to apply a corrosion resistant layer over bands 98, 102 either by kinetic spray applying a material such as tantalum or thermal spaying another ceramic. Such thermal spray methods are known in the art. The corrosion resistance layer is preferably form 20 microns to 1 millimeter in thickness.

Figure 5:
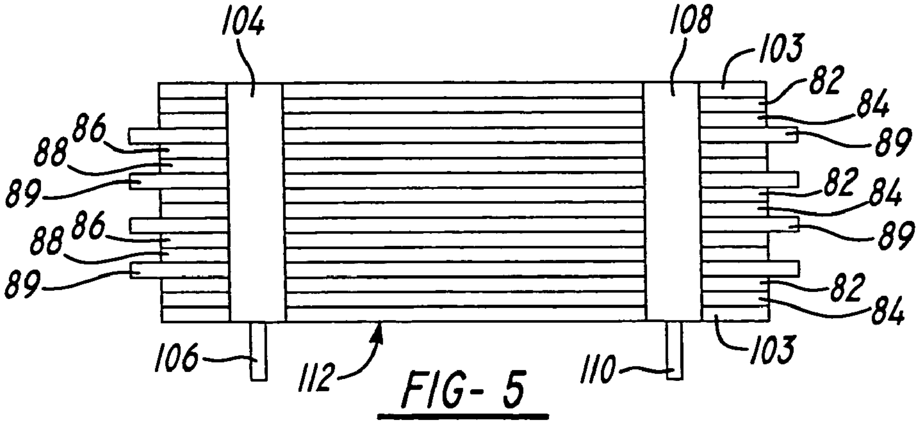
FIG. 5 is an end view of a part of a second embodiment of a non-thermal plasma reactor stack secured using the method of the present invention.

FIG. 5 also shows a stack 112 as described in FIG. 4 with the difference that a first band 104 includes a conductive wire or ribbon 106 embedded in the band 104 while the kinetic spray process is occurring. The wire or ribbon 106 can be directly connected to a power source. Likewise a second band 108 includes a conductive ribbon or wire 110 that was embedded in the band 108 while the kinetic spray process was occurring.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

The invention claimed is:

1. A method of securing a plurality of ceramic elements to each other comprising the steps of a) providing particles of a material to be sprayed;

b) providing a supersonic nozzle;

c) providing a plurality of ceramic elements releasably held together and positioned opposite the nozzle;

d) directing a flow of a gas through the nozzle, the gas having a temperature of from 600 to 1200 degrees Fahrenheit; and e) entraining the particles in the flow of the gas and accelerating the particles to a velocity sufficient to result in adherence of the particles to the ceramic elements upon impact, thereby forming at least a first band of adhered material on the ceramic elements and securing the ceramic elements together.

2. The method of claim 1, wherein step a) comprises providing particles having an average nominal diameter of from 60 to 106 microns.

3. The method of claim 1, wherein step b) comprises providing a nozzle having a throat with a diameter of from 1.5 to 3.0 millimeters.

4. The method of claim 1, wherein step a) comprises providing particles comprising an electrically conductive material.

5. The method of claim 4, wherein step a) comprises providing copper, a copper alloy, nickel, a nickel alloy, aluminum, an aluminum alloy, a stainless steel, and mixtures of these materials as the electrically conductive material.

6. The method of claim 1, wherein step e) comprises forming the first band having a thickness of from 1 millimeter to 2.5 centimeters.

7. The method of claim 1, wherein step e) comprises forming a plurality of bands.

8. The method of claim 1, wherein step e) further comprises directing the particles at the ceramic elements at an angle of from 0 to 45 degrees relative to a line drawn normal to the ceramic elements.

9. The method of claim 1, wherein step e) further comprises directing the particles at the ceramic elements at an angle of from 15 to 25 degrees relative to a line drawn normal to the ceramic elements.

10. The method of claim 1, wherein step e) further comprises moving one of the plurality ceramic elements or the nozzle past the other at a speed of from 0.5 to 13 centimeters per second.

11. The method of claim 1, wherein step e) further comprises moving one of the plurality ceramic elements or the nozzle past the other at a speed of from 0.5 to 6.5 centimeters per second.

12. The method of claim 1, wherein step c) comprises positioning the plurality of ceramic elements opposite the nozzle at a distance of from 10 to 40 millimeters.

13. The method of claim 1, wherein step c) comprises positioning the plurality of ceramic elements opposite the nozzle at a distance of from 10 to 20 millimeters.

14. The method of claim 1, further comprising after step e) the step of applying an outer layer over the band, the outer layer comprising one of tantalum or a ceramic.

15. The method of claim 1, wherein step e) further comprises embedding one of an electrically conductive wire or electrically conductive ribbon in the first band.

16. A method of forming a non-thermal plasma reactor comprising the steps of a) providing particles of an electrically conductive material to be sprayed;

b) providing a supersonic nozzle;

c) providing a first plurality of ceramic elements and a second plurality of ceramic elements, the ceramic elements releasably held together and positioned opposite the nozzle, with the first plurality of ceramic elements each having a ground electrode with a connector and the second plurality of ceramic elements each having a charge electrode with a connector;

d) directing a flow of a gas through the nozzle, the gas having a temperature of from 600 to 1200 degrees Fahrenheit; and e) entraining the particles in the flow of the gas and accelerating the particles to a velocity sufficient to result in adherence of the particles to the ceramic elements upon impact, directing the accelerated particles at the connectors of the first plurality of ceramic elements forming a first band of adhered material electrically coupling the electrodes of the first plurality of ceramic elements together and directing the accelerated particles at the connectors of the second plurality of ceramic elements forming a second band of adhered material electrically coupling the electrodes of the second plurality of ceramic elements together, and the first and the second bands securing the ceramic elements together.

17. The method of claim 16, wherein step a) comprises providing particles having an average nominal diameter of from 60 to 106 microns.

18. The method of claim 16, wherein step b) comprises providing a nozzle having a throat with a diameter of from 1.5 to 3.0 millimeters.

19. The method of claim 16, wherein step a) comprises providing copper, a copper alloy, nickel, a nickel alloy, aluminum, an aluminum alloy, a stainless steel, and mixtures of these materials as the electrically conductive material.

20. The method of claim 16, wherein step e) comprises forming the first and the second bands to have a thickness of from 1 millimeter to 2.5 centimeters.

21. The method of claim 16, wherein step e) further comprises directing the particles at the ceramic elements and connectors at an angle of from 0 to 45 degrees relative to a line drawn normal to the ceramic elements.

22. The method of claim 16, wherein step e) further comprises directing the particles at the ceramic elements at an angle of from 15 to 25 degrees relative to a line drawn normal to the ceramic elements.

23. The method of claim 16, wherein step e) further comprises moving one of the plurality ceramic elements or the nozzle past the other at a speed of from 0.5 to 13 centimeters per second.

24. The method of claim 16, wherein step e) further comprises moving one of the plurality ceramic elements or the nozzle past the other at a speed of from 0.5 to 6.5 centimeters per second.

25. The method of claim 16, wherein step c) comprises positioning the plurality of ceramic elements opposite the nozzle at a distance of from 10 to 40 millimeters.

26. The method of claim 16, wherein step c) comprises positioning the plurality of ceramic elements opposite the nozzle at a distance of from 10 to 20 millimeters.

27. The method claim 16, further comprising after step e) the step of applying an outer layer over each of the bands, the outer layers comprising one of tantalum or ceramic.

28. The method of claim 16, further comprising in step e) the step of embedding one of an electrically conductive wire or an electrically conductive ribbon in said first and second bands.

* * * * *